United States Patent [19]

Honemeyer et al.

[11] 4,357,111
[45] Nov. 2, 1982

[54] CONTINUOUS MIXING DEVICE AND PROCESS

[75] Inventors: Rolf Honemeyer, Herford; Wolfgang Müller, Lemgo, both of Fed. Rep. of Germany

[73] Assignee: MTI-Mischtechnik Industrieanlagen GmbH, Detmold, Fed. Rep. of Germany

[21] Appl. No.: 107,524

[22] Filed: Dec. 27, 1979

[51] Int. Cl.$^3$ .......................... B01F 7/22; B01F 15/02
[52] U.S. Cl. ...................................... 366/145; 99/348; 366/183; 366/196; 241/65; 241/282.1
[58] Field of Search ............... 366/131, 183, 136, 137, 366/159, 309, 312, 314, 205, 145, 149, 196; 99/348; 241/65, 282.1

[56] References Cited

U.S. PATENT DOCUMENTS

| | | | |
|---|---|---|---|
| 2,918,956 | 12/1959 | Otto | 241/282.1 |
| 3,201,095 | 8/1965 | Erwien | 366/314 |
| 3,250,519 | 5/1966 | Herfeld | 366/314 |
| 3,612,125 | 10/1971 | Krauth | 366/205 |
| 3,671,296 | 6/1972 | Yoshiro | 366/314 |
| 3,848,816 | 11/1974 | Morley | 241/65 |

FOREIGN PATENT DOCUMENTS

| | | |
|---|---|---|
| 1188264 | 3/1965 | Fed. Rep. of Germany. |
| 1257553 | 12/1967 | Fed. Rep. of Germany. |
| 1778436 | 1/1974 | Fed. Rep. of Germany. |
| 1679865 | 3/1974 | Fed. Rep. of Germany. |

*Primary Examiner*—Robert W. Jenkins
*Attorney, Agent, or Firm*—Murray and Whisenhunt

[57] ABSTRACT

A continuous mixing device is disclosed, as well as a process for mixing. At least two different materials can be mixed together with substantially uniform product mixing and heat distribution by introducing the materials into the top of a substantially cylindrical, vertical mixing device. A shaft which enters the vessel through the base extends coaxially therein, and carries a number of mixing blades thereon. The upper end of the shaft is surrounded by the lower end of the product feed line. Product introduced into the device is passed downward in the vessel, with product mixing near the center of the vessel, and then moves in an upward direction near the vessel periphery. Upon reaching the top of the vessel, the mixed product encounters a deflector, which splits the mixed product into two portions, one of which is discharged as finished mixed product, and the other portion of which is fed back to a funnel which surrounds the lower end of the product feed line. The mixing of a portion of material which has already passed through the mixing device with fresh incoming feed produces an even more intensive mixing, and also results in the incoming material to reach the desired mixing temperature in less time.

The device and process can be used for the continuous mixing of various substances, and finds particular use in the mixing of plastic materials.

16 Claims, 2 Drawing Figures

CONTINUOUS MIXING DEVICE AND PROCESS

BACKGROUND OF THE INVENTION

The present invention is directed to a device and process for the continuous mixing of substances, and particularly plastics, wherein the products which are to be mixed may be in powder, granule or liquid form. The products which are to be mixed are continuously introduced into the mixer, and the finished, mixed product is continuously removed from the mixer.

Continuous mixers are known to the art, in various embodiments. The state of the mixing art is illustrated by German Pat. Nos. 1,188,264; 1,193,016; 1,244,723 and 1,679,865, and German published Patent Application No. 1,778,436.

A continuously operating mixer offers the advantage that it can be installed immediately before a processing device, such as an extruder or calendering rolls, so that the mixed product can be directly brought in the mixer to the desired processing temperature, and thereby obviate the need for intermediate heating between the mixer and the processing device. With such a continuous mixing process, the prior art has at times encountered problems in obtaining a uniformly and intensively mixed material, and also in particular in ensuring a uniform heat distribution within the mixer, so as to avoid the formation of heat pockets. To overcome these problems, a variety of attempts have been made by the prior art to conduct the materials being introduced as directly as possible to the mixing blades, or to premix the material being mixed with the aid of separately installed mixing devices, as described in the abovementioned German Pat. No. 1,118,264.

SUMMARY OF THE INVENTION

The present invention is directed to a process and a mixing device for the continuous, uniform mixing of product, with particularly uniform heat distribution. According to the invention, a portion of the finished, mixed product is diverted prior to removal from the mixing device, and recycled into the raw materials being introduced into the mixing device.

With the traditional mixing process known to the art, occasionally and more or less accidentally the finished product may come into contact with raw products to be introduced to the mixer. The present invention, however, in contrast is directed to deliberately diverting a partial stream of finished, mixed product immediately before the outlet from the mixer, and conducting this stream in the mixing vessel directly to the raw products entering the mixer. By utilizing this approach, the raw products reach the desired mixing temperature relatively quickly, and the recycling of a portion of the finished, mixed product produces an even more intensive mixing action.

The mixing device of the present invention comprises an essentially cylindrical, vertical mixing vessel containing a number of mixing tools, such as blades or the like, attached to a shaft which is coaxially mounted within the lower portion of the mixing vessel, and which vertically enters the vessel base. The mixing vessel includes a feed tube for incoming raw materials which enters the vessel from the top. The feed tube is coaxial with the shaft. An outlet for the finished, mixed product is provided on one side of the mixing vessel near the top thereof, and has a deflecting device installed therein, or in the vicinity of the outlet. The lower end of the feed tube is surrounded by a funnel, with the gap left between the feed tube and the funnel. The mixing blades and the deflecting device cooperate in use so that a portion of the mixed product stream is discharged from the mixing device, and another portion of the mixed product stream is recycled back into the funnel from above, and is mixed with fresh feed material introduced through the feed tube.

The funnel is preferably conical and vertically adjustable, and preferably the deflecting device is also adjustable in relation to the stream of material which is to be diverted and divided.

The mixing blades on the shaft are so designed that only finished, mixed material enters the upper portion of the mixing vessel above the mixing blades, and thus the recycled finished, mixed material is introduced into the funnel from the top.

DETAILED DESCRIPTION OF THE INVENTION

Figure 1:
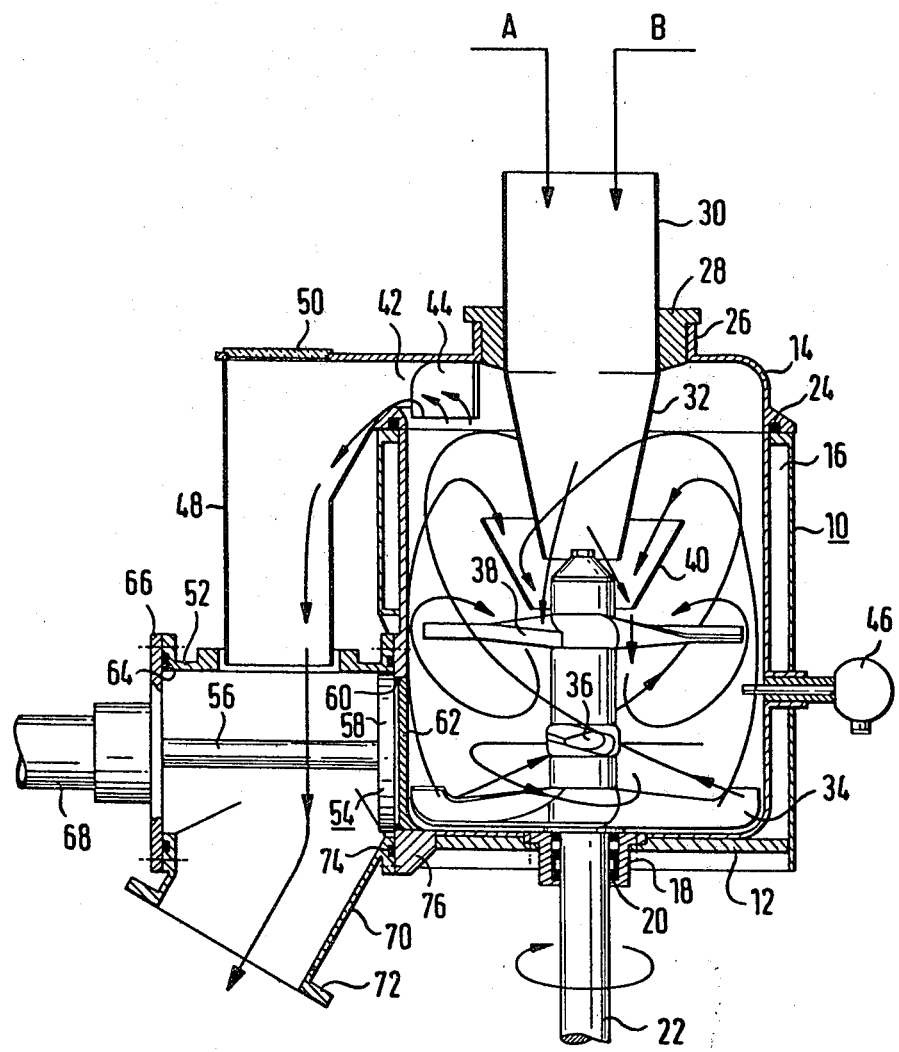
Figure 2:
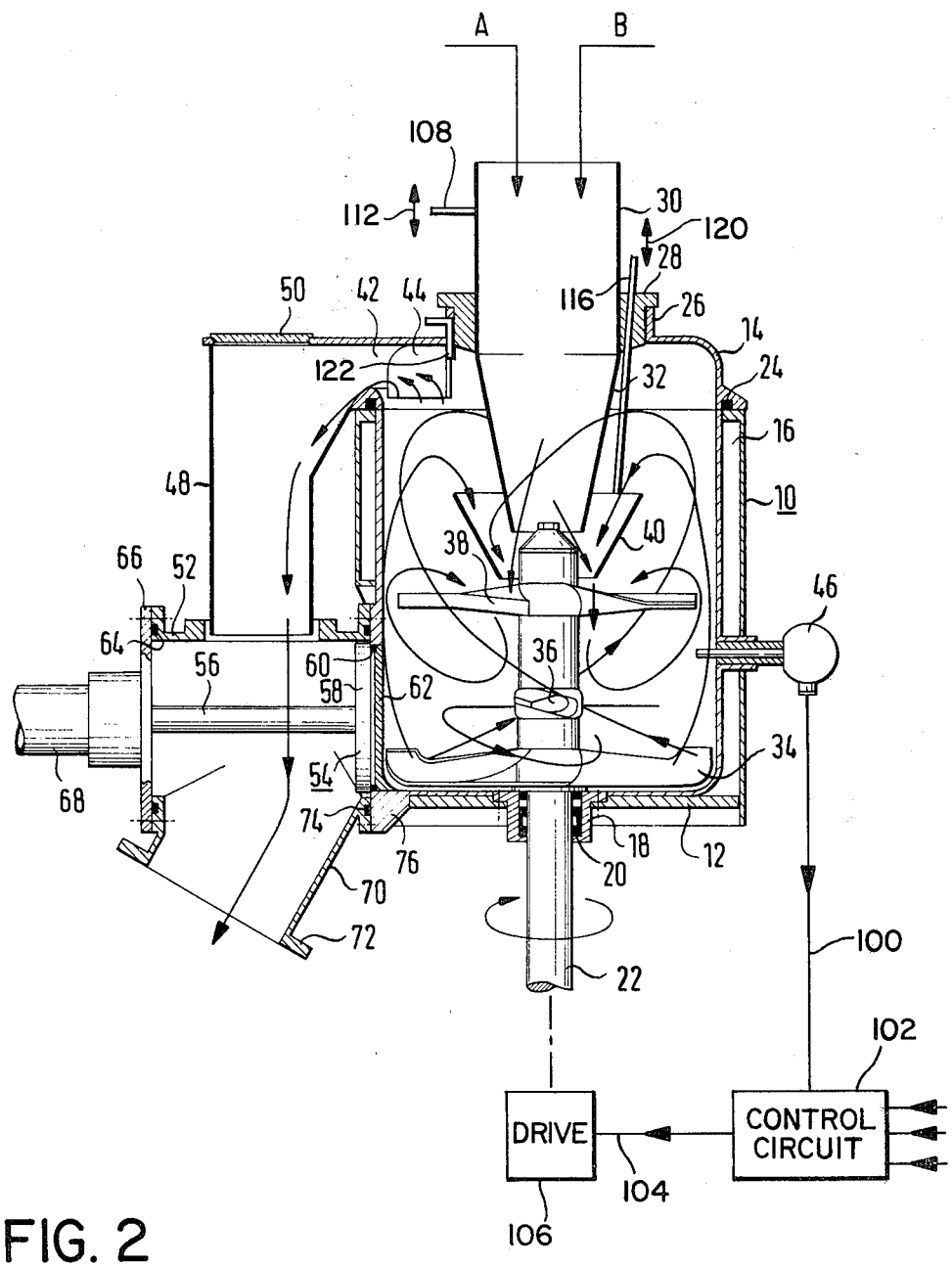

The present invention will be more clearly understood with reference to the accompanying drawing, wherein FIG. 1 illustrates a schematic vertical section through a mixer device of the present invention and FIG. 2 illustrates the control devices for controlling the mixing device of FIG. 1.

In the drawing, the mixer device of the present invention comprises an essentially cylindrical, vertically mounted mixing vessel 10, which includes a base 12 and a top 14. The cylindrical walls of mixing vessel 10 are constructed in the form of a cooling or heating jacket 16, so that the mixer can be used for continuous hot or cold preparation of mixtures of at least two components. Base 12 of vessel 10 is provided with a flanged sleeve 18, which is located along the axis of the cylindrical vessel 10, and which serves to hold suitable gaskets 20 to dynamically seal the entrance for shaft 22. Shaft 22 is connected underneath the mixing vessel 10 with a variable speed driving mechanism, such as, for instance, a variable speed driving motor (not shown) which will be described in greater detail below.

Top 14 is connected to the jacket of mixing vessel 10 by means of a gasket 24 and suitable connecting devices (not shown). Top 14 has a circular opening which is coaxial with the axis of cylindrical vessel 10. The edge of the circular opening is provided with a vertically projecting sleeve 26. Sleeve 26 is located around flanged circular ring 28, in the central circular opening of which is installed feed tube 30 through which raw products to be mixed (designated A and B), are fed into the mixing vessel 10.

The lower end 32 of feed tube 30 is tapered in the form of a truncated cone, and ends essentially level with the top of shaft 22.

Shaft 22 carries mixing blades 34, 36, 38 on three superjacent planes, at least two of such blades being mounted with a uniform angular distribution in each of the planes. Mixing blades 34, 36, 38 are in addition offset in their angular arrangement by, for example, 90° in relation to the mixing tools in the other planes. The bottom of lowermost mixing blade 34 has a configuration which essentially conforms to the inside of base 12 of vessel 10, so that blades 34 scrape the product from the bottom of the vessel. The outer radial portions of the topmost mixing blades 38 lie essentially on the plane of rotation, or vertically to the plane of the drawing, but their inner radial portions are inclined upwards in relation to the direction of rotation of the blades. Thus, the inner radial portions of blades 34 exert a downward suction on the material in the mixing vessel, whereas in the outer radial portions the blades 34 exert pressure both upward and downwards on the material.

A funnel 40 which tapers downwardly in the form of a truncated cone, and which is provided with a mechanism (not shown) by which it can be adjusted vertically is located in the transition zone between the lower end of the feed tube 30 and the upper end of shaft 22. Funnel 40 surrounds both feed tube 30 and the top end of shaft 22, with a gap left between funnel 40, feed tube 30, and shaft 22. Funnel 40 terminates a short distance above the rotational plane of upper mixing blades 38.

Mixing blades 34, 36, 38 are shaped and arranged so that the product is completely mixed in the area below the uppermost mixing blades 38. After being so completely mixed, part of the mixed product is forced upwards by the uppermost mixing blades 38, as indicated by the arrows in the drawing, which represent product path through the mixing device.

As illustrated in the drawing, the top left corner of mixing vessel 10 contains an outlet 42 for the finished, mixed product, and a deflector 44, which may be, for example, an angularly adjustable baffle, is installed in front of the outlet. By suitable adjustment of deflecting device 44 any desired portion of the mixed product arriving at outlet 42 can be discharged through the outlet or recycled back to funnel 40 from above. The recycled portion of the finished, mixed product encounters fresh raw products entering the mixer immediately below the feed tube lower end 32, and is mixed with such raw product.

The right wall of mixing vessel 10 contains a temperature sensor 46 which delivers control signals to the variable speed driving motor which drives shaft 22, and adjusts the speed to ensure that the temperature inside the mixer, which is speed dependent, can be held at a predetermined value with a very high degree of accuracy.

A vertical outlet tube 48, constructed essentially in the form of a cylinder, and sealed at the top by transparent cover 50, used for monitoring, and removable for cleaning purposes, is located adjacent outlet 42. The lower end of outlet tube 48 radially enters cylinder 52, which contains closing piston 54 on horizontal piston rod 56. Closing piston 54 includes a carrier plate 58 mounted on the end of piston rod 56, and closing plate 62 is mounted on carrier plate 58. Closing plate 62 sealingly fits, by means of a gasket 60, which may suitably be an O-ring, into a corresponding opening in the wall of mixing vessel 10, and can be withdrawn from the opening by piston rod 56 to completely empty mixing vessel 10.

Circular cover 66 is attached by means of gasket 64 to the left end of cylinder 52, and an axial drive 68, such as a pneumatic or hydraulic cylinder, which serves to operate piston rod 56, is attached to the outer side of cover 66. When piston rod 56 is drawn back, carrier plate 58 essentially reaches plate 66, so that the remaining material from mixing vessel 10 can exit through outlet pipe 70 which extends at an angle to the left from cylinder 52. Outlet pipe 70 is provided at its free end with flange 72 for connection to a subsequent work station, and is connected by means of a gasket 74 and suitable attachment devices (not shown) to plate 66 and also to transition piece 76 that is in turn connected to base 12 of mixing vessel 10.

OPERATION OF THE MIXING DEVICE

The mixing device of the type described above works in the following manner. Using suitable continuously operating gravimetric or volumetric metering devices (not shown in the drawing) two or more components are introduced in a predetermined ratio through feed tube 30 into mixing vessel 10 while shaft 22 and therefore mixing blades 34, 36, 38 are rotating. The unmixed material introduced into mixing device 10 enters a pre-mixing zone inside of funnel 40 through an annular slit between the lower end of feed tube 30 and the top end of shaft 22. In this pre-mixing zone the newly introduced material encounters the mixed material which has been recycled. This depends, of course, upon material already being recycled within mixing vessel 10 as described, with the material being mixed at a filling height above the top edge of funnel 40.

A portion of the finished, mixed material reaching outlet 42 moves down the lower end 32 of feed tube 30 to reenter the pre-mixing zone inside of funnel 40. The newly introduced raw product materials enter almost vertically through feed tube 30, whereas the previously mixed recycle material inside of funnel 40 is executing a circular movement, so that relatively intense mixing and distribution of the two product streams occur. Mixing tools 34, 36, 38 draw the premixed material near shaft 22 down into the lower section of the mixer, which may be considered the main mixing zone. In the main mixing zone the materials are intensively reworked with both vertical and horizontal movement.

The outer ends of uppermost mixing blade 38 push the mixed product upwards, so that part of the mixed product exits through outlet 42, and a portion is recycled back into funnel 40.

The temperature within the mixer is kept relatively constant during the entire mixing process by controlling the rotational speed of shaft 22 through the driving motor therefor. If such temperature control is insufficient for a particular process, a heating or cooling agent can be fed into heating and cooling jacket 16.

If the products to be mixed are to be hot worked, the mixing system is heated up by filling the mixing cylinder 10 only to a level such that no insufficiently mixed material can exit from the mixer. The feed of fresh material is interrupted until the material within the mixing vessel has reached a specific predetermined temperature level, at which point the process can then be switched over to continuous mixing operation.

If a liquid component is to be added to a solid component, it is preferred that the liquid component be introduced near the bottom of funnel 40. In the case of hot mixing, the mixture at this point is already preheated, and is thus able to more readily absorb the liquid components.

As different materials to be mixed have different flow properties, it may be preferred to install feed tube 30 in top 14 of mixing vessel 10 in such a way that the feed tube 30 can be vertically adjusted. In addition, it is also preferred that funnel 40 be vertically adjustable. With both feed tube 30 and funnel 40 adjustable, the aperture widths of the various annular slits can be varied.

The angle in inclination of lower end 32 of feed tube 30, and of funnel 40, as shown in the drawing is to be considered as examplary only, as the angles may be selected larger or smaller than the illustrated angles, as circumstances require, and in an extreme case both the lower end 32 of feed tube 30 and funnel 40 can be cylindrical in shape.

The control of the mixing device of the present invention will be more clearly illustrated in FIG. 2. Temperature sensor 46 monitors the temperature inside of mixing vessel 10 and delivers a signal 100 to control circuit 102. Control circuit 102 in turn sends an appropriate signal 104 to drive 106, with the signal 104 being related to signal 100 so that the speed-dependent temperature inside of mixer 10 is held within a predetermined value.

Lever 108 is attached to feed tube 30, and is movable in the directions shown by arrow 112, in order to adjust the feed tube 30 in the vertical direction. Likewise, rod 116 is movable in the direction shown by arrow 120, so that the funnel 40 is vertically adjustable.

Deflector 44 in outlet 42 is connected to handle 122, with appropriate detent stops (not shown) to adjust the angle of deflector 44 in outlet 42, thereby controlling the portion of mixed product arriving at outlet 42 which is discharged through the outlet.

The process of the present invention, and the mixing device of the present invention, are such that under no circumstances can raw material reach the outlet virtually unchanged, as the raw material introduced into the mixing device first undergoes pre-mixing in the pre-mixing zone in the funnel, and is then subjected to further, intensive mixing in the main mixing zone.

As indicated hereinabove, deflecting device 44 is adjustable, so that the relative proportion of discharged product and recycled product may be varied, depending upon the particular characteristics of the material being mixed. Under normal conditions, however, the proportion of recycled material will generally be in a ratio, compared to the amount of discharged product, of 80:20 to 20:80.

The mixing device and process can be utilized to mix two or three or four or more materials together, in any particular ratio. Normally at least two of the materials to be mixed will be present in a concentration of at least 0.1 volume percent, based upon the volume of the total feed to the product feed to the mixing device, but the amount of one component can be significantly less, such as, for instance, in the case of mixing a dye or pigment into a synthetic polymer.

The speed of rotation of the mixing blades and the shaft can vary considerably, depending upon the particular materials being mixed and the intensity of mixing which is desired. In order to provide adequate mixing, however, it has generally been found preferable to utilize a mixing speed of at least 600–750 rpm. Normally a rotational speed of greater than 2,500 rpm will not be used, but these values can vary, depending upon the particular materials and the size of the mixing blades.

What is claimed is:

1. Device for continuously mixing together at least two different materials with substantially uniform product mixing and heat distribution, said device comprising an essentially cylindrical, vertical mixing vessel having a base, a substantially vertical shaft entering the base of said vessel and extending coaxially therein, a plurality of mixing tools attached to said shaft within said vessel, filling tube means substantially coaxial with the shaft and entering the vessel from the top thereof for supplying fresh materials to be mixed, outlet means for discharging finished mixed product from said vessel located on said vessel near the top thereof, funnel means substantially coaxially surrounding the lower end of said filling tube and providing a gap therebetween, and deflector means located in or near said outlet means to split the mixed product into a first portion discharged from the device via said outlet means and a second portion introduced through said funnel into said fresh materials.

2. Device of claim 1, wherein said funnel is conically downwardly tapered.

3. Device of claim 2, wherein said deflecting device is adjustable.

4. Device of claim 2, wherein the lower end of said filling tube is tapered in the form of truncated cone.

5. Device of claim 2, wherein said shaft has wing-shaped mixing blades mounted thereon in three superjacent planes with at least two blades in each plane.

6. Device of claim 5, wherein the lower end of said funnel is located a short distance above the uppermost mixing blades, and forms an annular slit with the top end of said shaft.

7. Device of claim 6, wherein the lowermost mixing blades have a bottom configuration which generally conforms to the vessel base.

8. Device according to claim 6, wherein the mixing blades located in the uppermost mixing blade plane have an inner radial portion which is inclined upward in direct relation to the plane of rotation thereof, and an outer radial portion which lies essentially in said plane of rotation.

9. Device of claim 8, wherein said shaft is a variable speed shaft.

10. Device according to claim 9, wherein the speed of said shaft is controllable by temperature measuring means for measuring the temperature in said mixing vessel so as to maintain a predetermined mixing temperature.

11. Device of claim 8, wherein said funnel is vertically adjustable.

12. Device of claim 8, wherein said filling tube is vertically adjustable.

13. Device for continuously, substantially uniformly mixing together at least two different materials with substantially uniform heat distribution during mixing, said device comprising an essentially cylindrical, vertical mixing vessel having a base, substantially vertical feed means for supplying fresh material to be mixed to said vessel, outlet means for discharging finished, mixed product from said vessel, and located on said vessel near the top thereof, mixing means for mixing together materials introduced through said feed means and for passing said materials near the axis of said vessel in a downward direction, and for passing materials near the sides of said vessel in an upward direction and towards said outlet means, funnel means surrounding the lower end of said feed means and providing a gap therebetween, and deflector means located in or near said outlet means, said mixing means and said deflector means cooperating to split the mixed product produced by said mixing device into a first portion discharged from said mixing device through said outlet means, and a second portion which is recycled in said mixing device through said funnel means to mix with fresh materials introduced through said feed means.

14. Device of claim 13, wherein said mixing means includes a substantially vertical shaft entering the base of said vessel and extending coaxially therein, the end of said shaft in said vessel being surrounded by said feed means, and a plurality of mixing blades located on said shaft.

15. Device of claim 14, wherein said plurality of mixing blades are located in each of a plurality of axial planes along said shaft.

16. Device of claim 15, wherein the blades located in the uppermost plane have an inner radial portion which is inclined upwards in relation to the direction of rotation, and an outer radial portion which lies essentially in the plane of rotation.

* * * * *